(12) United States Patent
Hsu et al.

(10) Patent No.: US 10,042,350 B2
(45) Date of Patent: Aug. 7, 2018

(54) SYSTEM AND METHOD FOR DETECTING PRINTING FILAMENT FOR THREE DIMENSIONAL PRINTING

(71) Applicant: HON HAI PRECISION INDUSTRY CO., LTD., New Taipei (TW)

(72) Inventors: Shao-Hung Hsu, New Taipei (TW); Wei-Yu Chen, Santa Clara, CA (US)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 68 days.

(21) Appl. No.: 15/394,724

(22) Filed: Dec. 29, 2016

(65) Prior Publication Data
US 2018/0143610 A1    May 24, 2018

(30) Foreign Application Priority Data
Nov. 21, 2016 (CN) .......................... 2016 1 1026478

(51) Int. Cl.
| | |
|---|---|
| B29C 31/00 | (2006.01) |
| B29C 64/118 | (2017.01) |
| B29C 64/321 | (2017.01) |
| G05B 19/402 | (2006.01) |
| B33Y 50/02 | (2015.01) |
| B33Y 30/00 | (2015.01) |
| B33Y 10/00 | (2015.01) |
| B65H 51/04 | (2006.01) |

(52) U.S. Cl.
CPC ............ G05B 19/402 (2013.01); B33Y 10/00 (2014.12); B33Y 30/00 (2014.12); B33Y 50/02 (2014.12); B29C 31/00 (2013.01); B29C 64/118 (2017.08); B29C 64/321 (2017.08); B29C 2945/76331 (2013.01); B29C 2945/76351 (2013.01); B65H 51/04 (2013.01); G05B 2219/45239 (2013.01); G05B 2219/49007 (2013.01)

(58) Field of Classification Search
CPC ........ G05B 19/402; G05B 2219/49007; G05B 2219/45239; B33Y 30/00; B33Y 10/00; B29C 2945/76331; B29C 64/321; B29C 2945/76351; B29C 31/00; B29C 64/118; B65H 51/04
See application file for complete search history.

(56) References Cited

U.S. PATENT DOCUMENTS

| | | | |
|---|---|---|---|
| 2013/0328228 A1* | 12/2013 | Pettis ..................... | F16M 11/12 264/40.1 |
| 2014/0265040 A1* | 9/2014 | Batchelder .......... | B29C 67/0055 264/409 |
| 2015/0145168 A1* | 5/2015 | Rodgers .............. | B29C 67/0055 264/308 |
| 2016/0332377 A1* | 11/2016 | Lee ........................ | B33Y 30/00 |
| 2017/0015060 A1* | 1/2017 | Lewicki ................ | B29C 64/209 |

(Continued)

*Primary Examiner* — Ronald D Hartman, Jr.
(74) *Attorney, Agent, or Firm* — ScienBiziP, P.C.

(57) ABSTRACT

A system for detecting a filament for printing in three dimensional printing (3DP) which can automatically detect the presence of a filament includes a feeding device, a detection device, a driving device, and an indication module. The driving device drives the feeding device and the detection device detects and determines the normal presence of a filament from the feeding device. The indication module outputs a signal to correspond to the presence of a filament or otherwise. A 3DP filament detection method is also provided.

19 Claims, 9 Drawing Sheets

(56) References Cited

U.S. PATENT DOCUMENTS

| | | | |
|---|---|---|---|
| 2017/0087767 A1* | 3/2017 | Grewell | B33Y 10/00 |
| 2017/0113405 A1* | 4/2017 | Gandhi | B29C 64/106 |
| 2017/0120513 A1* | 5/2017 | Brennan | B28B 1/001 |
| 2017/0136707 A1* | 5/2017 | Batchelder | B29C 67/0088 |
| 2017/0203507 A1* | 7/2017 | Leavitt | B29C 67/0055 |
| 2017/0252851 A1* | 9/2017 | Fulop | B33Y 10/00 |
| 2017/0312987 A1* | 11/2017 | Ladanyi | B29C 64/393 |
| 2017/0313541 A1* | 11/2017 | Wu | B33Y 30/00 |
| 2018/0043628 A1* | 2/2018 | Nadeau | B33Y 30/00 |
| 2018/0099461 A1* | 4/2018 | Matthews | B29C 67/0088 |

* cited by examiner

SYSTEM AND METHOD FOR DETECTING PRINTING FILAMENT FOR THREE DIMENSIONAL PRINTING

FIELD

The subject matter herein generally relates to a system and method for detecting three dimensional printing (3DP) filament.

BACKGROUND

A fused deposition modeling system can be used to build a part or model in three dimensions from a digital representation of the actual part in a layer-by-layer manner by extruding a flowable part material. A build material is usually supplied in filament form. It is necessary to determine whether a nozzle of a three-dimensional printer is extruding a filament of the material before the printer starts to print.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure. It should be noted that references to "an" or "one" exemplary embodiment in this disclosure are not necessarily to the same exemplary embodiment, and such references mean "at least one."

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1-FIG. 6 illustrate a filament detection system for three-dimensional printing (3DP filament detection system 100) in accordance with an exemplary embodiment.

Figure 1:
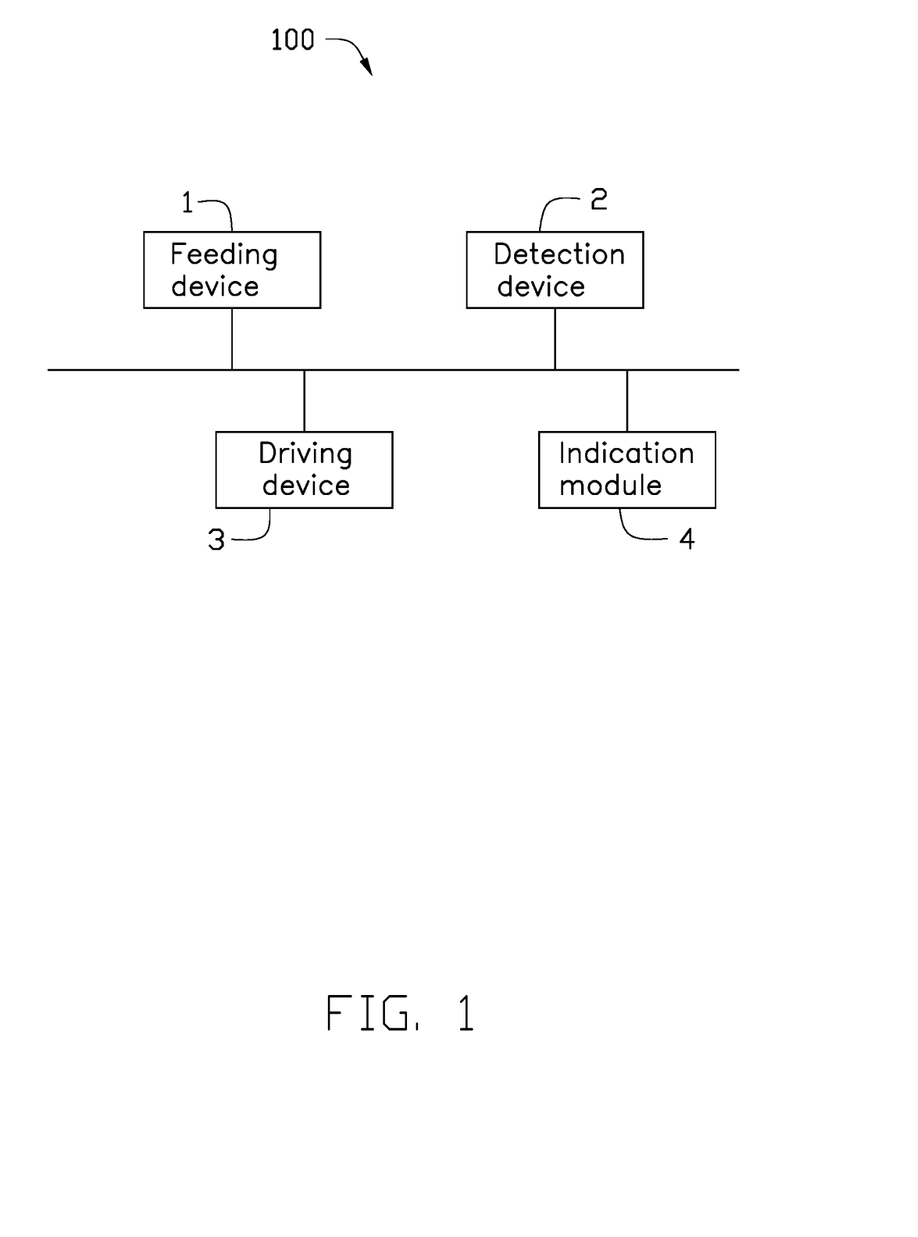
FIG. 1 is a block diagram of an exemplary embodiment of a filament detection system in a three-dimensional printer.

The 3DP filament detection system 100 comprises a feeding device 1, a detection device 2, a driving device 3, and an indication module 4. The driving device 3 is configured to drive the feeding device 1. The detection device 2 is configured to detect and determine whether the feeding device 1 is outputting normally a filament for 3D printing. The indication module 4 is configured to output a corresponding signal.

In one exemplary embodiment, the 3DP filament detection system 100 can comprise a 3D printer based on fused deposition modeling (FDM) technology.

Figure 2:
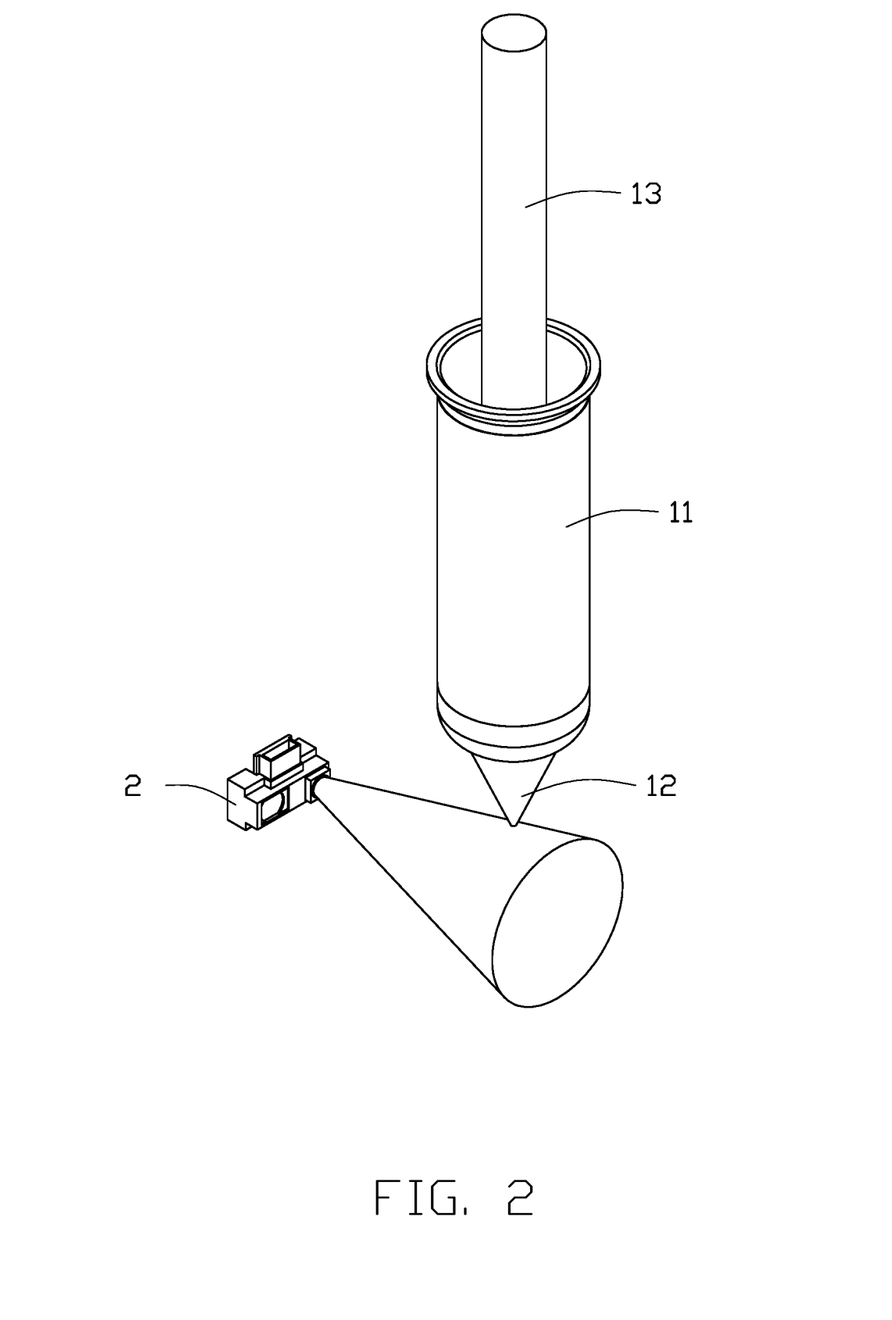
FIG. 2 is a diagram of an exemplary embodiment of a feeding device and a detection device of the system of FIG. 1.
Figure 3:
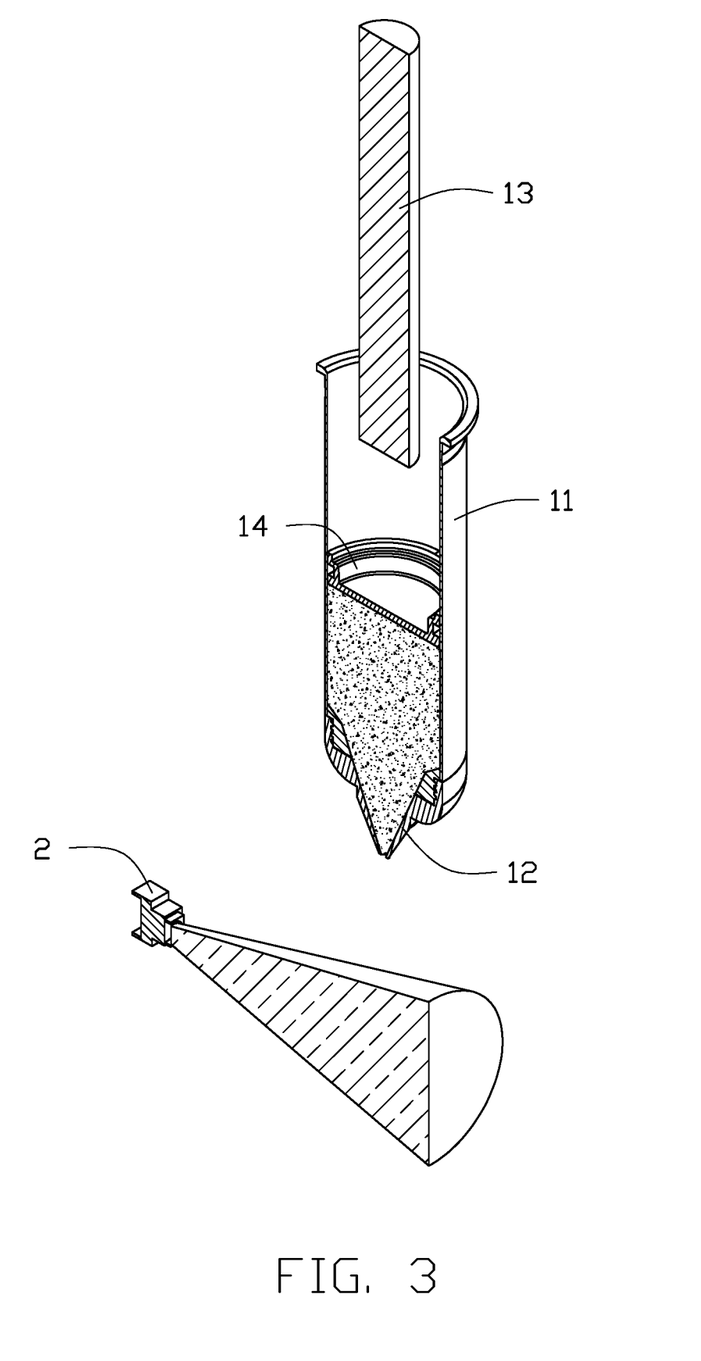
FIG. 3 is a cutaway diagram of an exemplary embodiment of the feeding device and the detection device of FIG. 2.

In FIGS. 2 and 3, the feeding device 1 comprises a feeding cylinder 11, a nozzle 12, a pushrod 13, and a piston 14. The feeding cylinder 11 is configured to store material (printing material) to be output as a filament in a 3D printing operation. The nozzle 12 is connected to an end of feeding device 11. The piston 14 is accommodated in the feeding cylinder 11. The pushrod 13 is received in the feeding cylinder 11. The pushrod 13 is configured to push the piston 14 to move in the feeding cylinder 11. Then the piston 14 extrudes the printing material to output the filament from the nozzle 12.

In one exemplary embodiment, a first end of the pushrod 13 connects to the piston 14, and a second end of the pushrod 13 extends out of the feeding cylinder 11. The detection device 2 can be a non-contact infrared sensor module, and the detection device 2 detects a feeding device state through light beams. The driving device 3 can be a motor drive module. The indication module 4 can comprise at least one light emitting diode.

Figure 4:
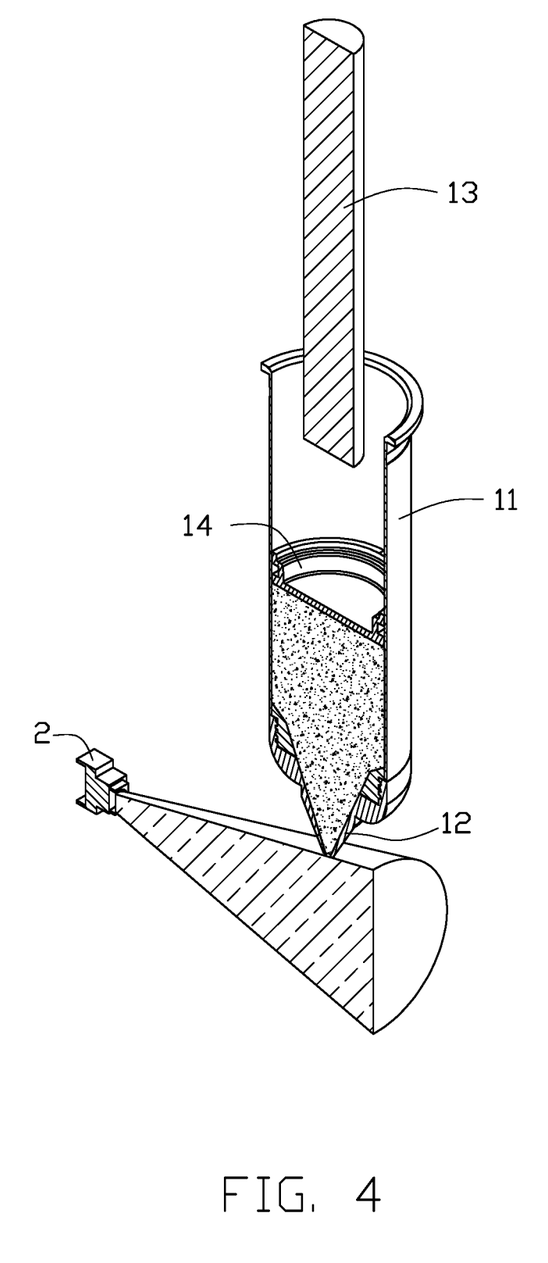
FIG. 4 is a first state diagram of an exemplary embodiment of the feeding device and the detection device of FIG. 2.

When the 3DP filament detection system 100 starts determining whether the feeding device 1 is outputting the filament, the detection device 2 is installed below and to the left of the feeding device 1 in an exemplary embodiment. The driving device 3 drives the feeding device 1 to move down. The detection device 2 starts to determine whether a nozzle reflected signal is being read. Until the detection device 2 reads a nozzle reflected signal, the driving device 2 continues to drive the feeding device 1 down. After a first predetermined time, if the detection device 2 still does not read the nozzle reflected signal, the indication module 4 is configured to output an abnormal operation signal.

In one exemplary embodiment, the detection device 2 also can be installed below and to the right of the feeding device 1.

When the detection device 2 reads the nozzle reflected signal, to confirm that the nozzle 12 is detected by detection device 2, the detection device 2 outputs a first control signal. The driving device 3 is further configured to drive the feeding device 1 to move up a predetermined distance after the detection device 2 reads the nozzle reflected signal. The nozzle 12 is thus removed from the detection area of the detection device 2. The detection device 2 can then detect only the filament, avoiding recognition of the nozzle 12 as the filament.

In one exemplary embodiment, the driving device 3 drives the feeding device 1 to move up a predetermined distance according to the first control signal. The predetermined distance can be one centimeter, but not limited to the predetermined distance in the exemplary embodiment.

After the feeding device 1 stops moving up, the driving device 3 is further configured to drive the pushrod 13 to move down, and the detection device 2 is configured to determine whether a filament reflected signal is read in a second predetermined time. When the detection device 2 reads the filament reflected signal in the second predetermined time, the feeding device 1 is deemed to be in a normal operation state, and the detection device 2 outputs a second control signal. The driving device 3 is configured to control the pushrod 13 to stop moving according to the second control signal. The indication module 4 is further configured to output a normal operation signal according to the second control signal.

If the detection device 2 does not read the filament reflected signal in the second predetermined time, the feeding device 1 is in an abnormal operation state, and the detection device 2 outputs a third control signal. This may indicate a non-flowing state of the printing material, or other abnormality. The driving device 3 is further configured to control the pushrod 13 to stop moving according to the third control signal. The indication module 4 is further configured to output the abnormal operation signal according to the third control signal.

In one exemplary embodiment, the first predetermined time can be 30 seconds and the second predetermined time can be 15 seconds.

In one exemplary embodiment, the driving device 3 drives the pushrod 13 to move down through at least two different drive modes. The drive modes comprise different pushing speeds and different pushing strengths. When the driving device 3 drives the pushrod 13 to move down, the pushing speed is decreased progressively and the pushing strength is increased progressively.

Figure 5:
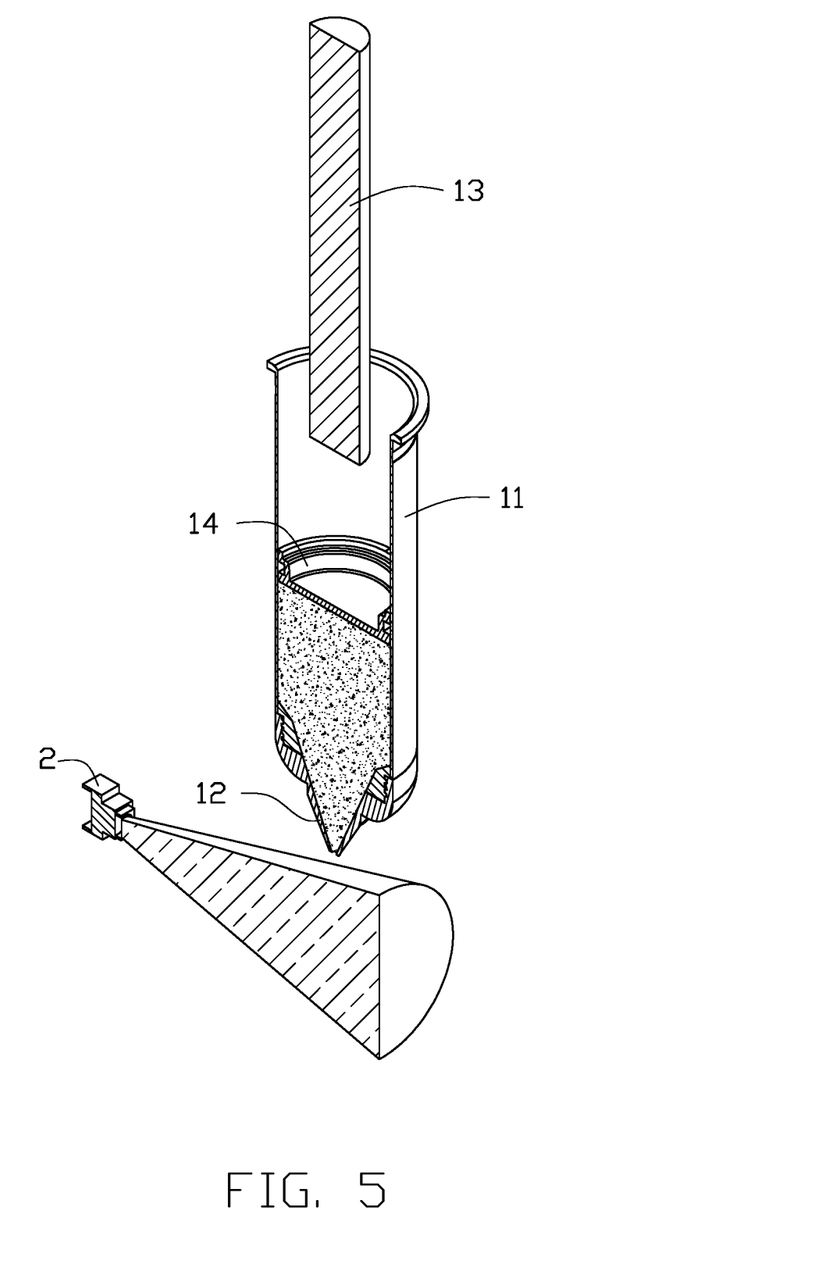
FIG. 5 is a second state diagram of an exemplary embodiment of the feeding device and the detection device of FIG. 2.
Figure 6:
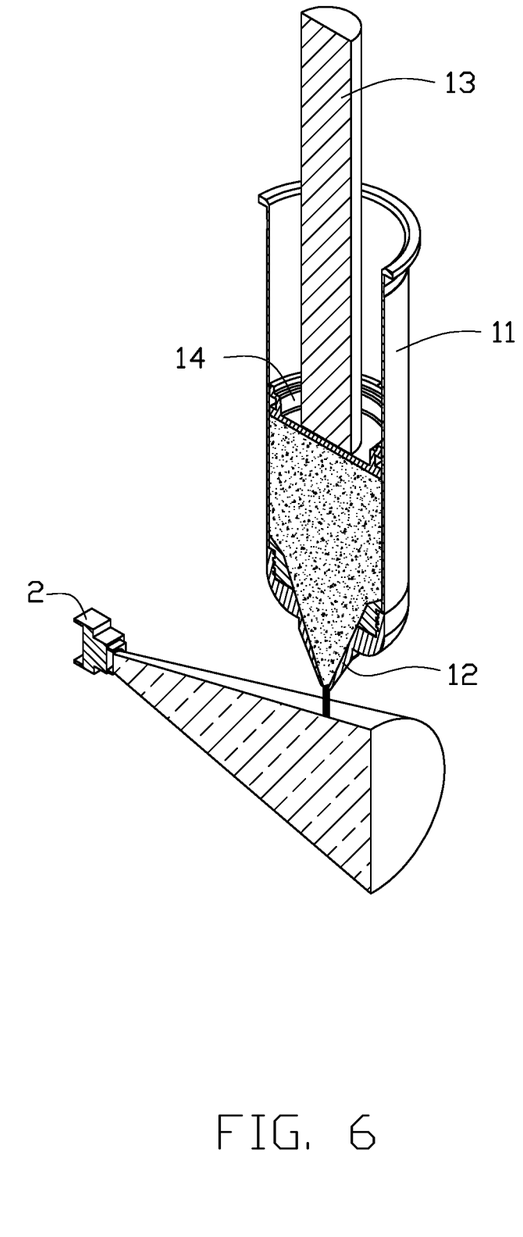
FIG. 6 is a third state diagram of an exemplary embodiment of the feeding device and the detection device of FIG. 2.

In FIGS. 5 and 6, the driving device 3 drives the pushrod 13 to move down through two different drive modes. A first driving mode comprises a first driving speed and a first driving strength. A second driving mode comprises a second driving speed and a second driving strength. The first driving speed is greater than the second driving speed, and the second driving strength is greater than the first driving strength. In an initial state, the driving device 3 drives the pushrod 13 to move down through the first driving mode (FIG. 5). When the driving device 3 is unable to drive the pushrod 13 down through the first driving mode, the driving device 3 switches modes and drives the pushrod 13 to move down through the second driving mode (FIG. 6).

Figure 7:
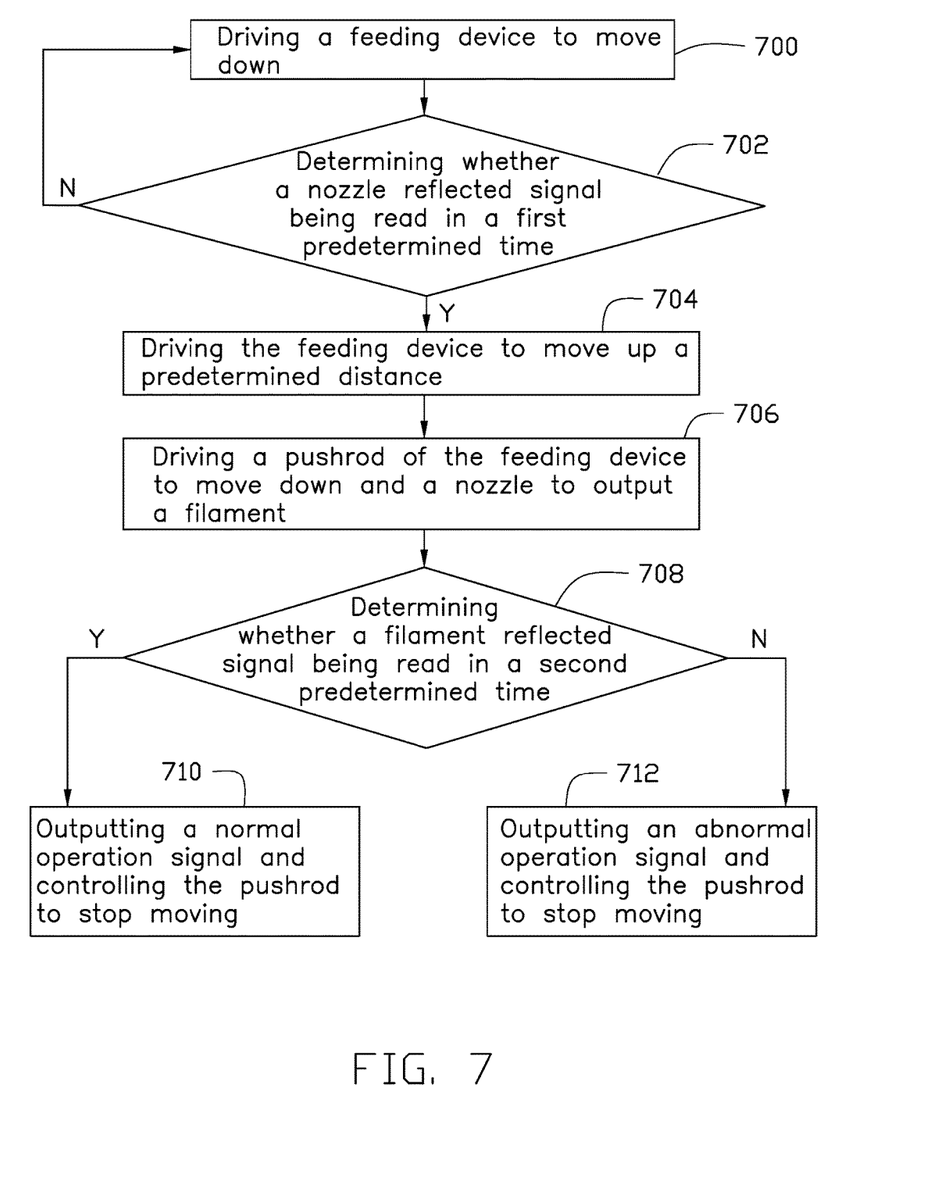
FIG. 7 is a flow diagram of a first exemplary embodiment of a method for detecting a filament.

FIG. 7 illustrates an exemplary embodiment of a 3DP filament detection method. The flowchart presents an exemplary embodiment of the method. The example method is provided by way of example, as there are a variety of ways to carry out the method. The method described below can be carried out using the configurations illustrated in FIG. 1-FIG. 6, for example, and various elements of these figures are referenced in explaining the example method. Each step shown in FIG. 7 represents one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step S700.

In step S700, the driving device 3 drives the feeding device 1 to move down.

In step S702, the detection device 2 determines whether a nozzle reflected signal is being read in a first predetermined time.

In step 704, if the detection device 2 reads the nozzle reflected signal in the first predetermined time, the driving device 3 drives the feeding device 1 to move up a predetermined distance. If not, the process turns to step S700.

In step S706, the driving device 3 drives the pushrod 13 to move down and the nozzle 12 output the filament.

In step S708, the detection device 2 determines whether the filament reflected signal is being read in a second predetermined time.

In step S710, if the detection device 2 reads the filament reflected signal in the second predetermined time, the driving device 3 controls the pushrod 13 to stop moving and the indication module 4 outputs a normal operation signal.

In step S712, if the detection device 2 does not read the filament reflected signal in the second predetermined time, the driving device 3 controls the pushrod 13 to stop moving and the indication module 4 outputs an abnormal operation signal.

Figure 8:
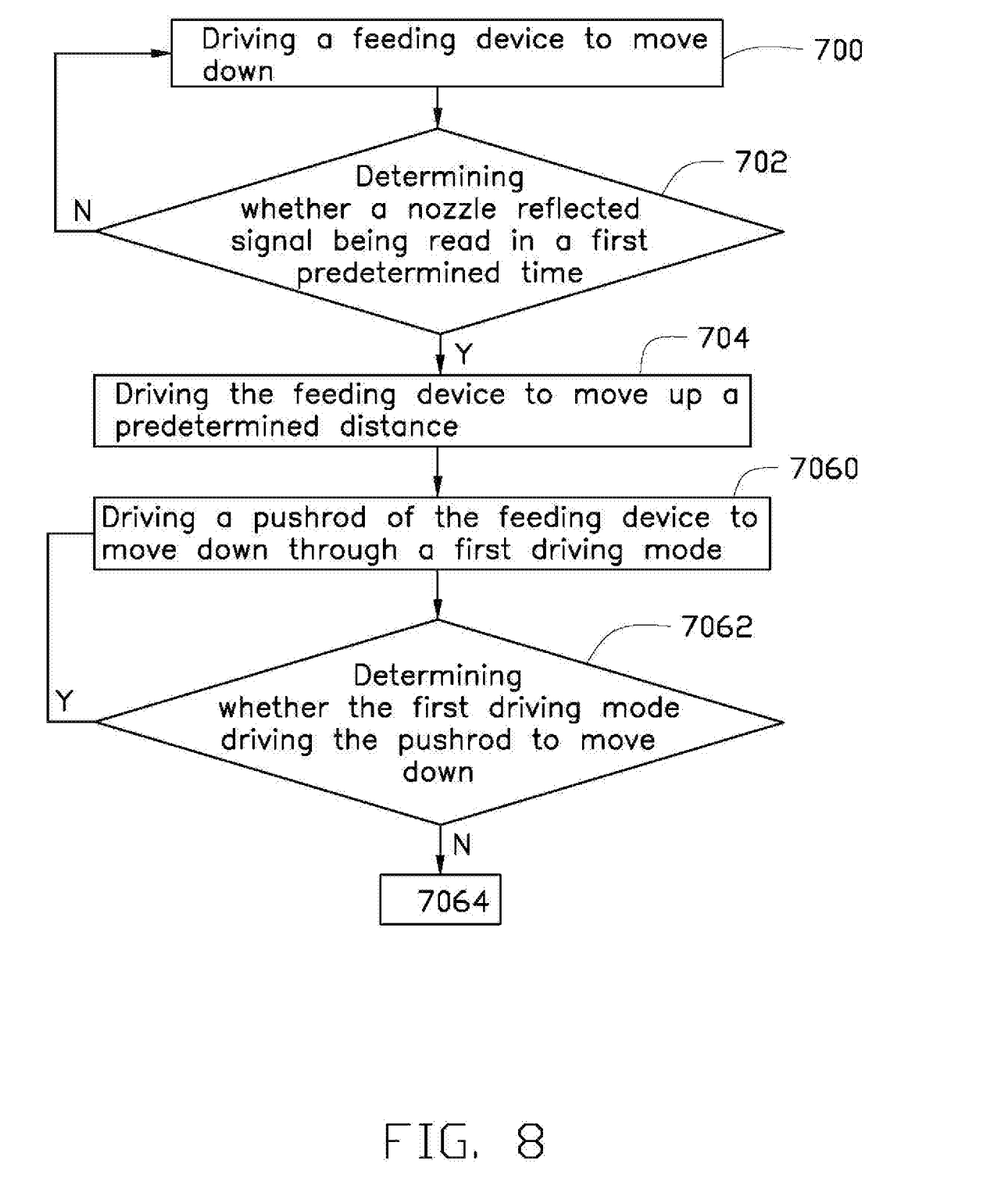
FIG. 8 is a part flow diagram of a second exemplary embodiment of the method for detecting a filament.
Figure 9:
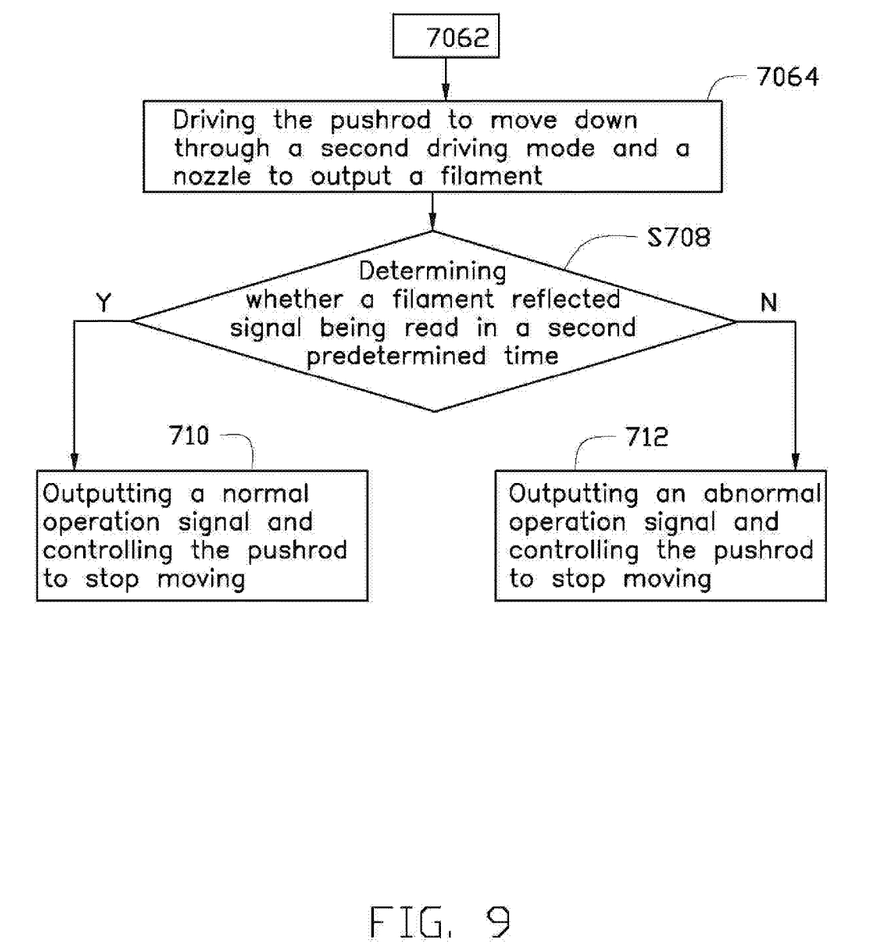
FIG. 9 is another part flow diagram continuing from FIG. 8.

Referring to FIG. 8 and FIG. 9, step S706 further comprises step S7060, step S7062, and step S7064.

In step S7060, the driving device 3 drives the pushrod 13 to move down through the first driving mode.

In step S7062, the driving device 3 determines whether the first driving mode is able to drive the pushrod 13 down.

In step S7064, the driving device 3 drives the pushrod 13 to move down through the second driving mode in response to the first driving mode being unable to drive the pushrod 13 down.

In one exemplary embodiment, the first driving mode comprises the first driving speed and the first driving strength. The second driving mode comprises the second driving speed and the second driving strength. The first driving speed is greater than the second driving speed, and the second driving strength is greater than the first driving strength.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A three dimensional printing (3DP) filament detection method comprising:
   driving a feeding device to move down;
   determining whether a nozzle reflected signal being read in a first predetermined time;
   driving the feeding device to move up a predetermined distance in response to reading the nozzle reflected signal in the first predetermined time;

driving a pushrod of the feeding device to move down and a nozzle to output a filament;
determining whether a filament reflected signal being read in a second predetermined time; and
outputting a normal operation signal and controlling the pushrod to stop moving in response to reading the filament reflected signal in the second predetermined time;
wherein the nozzle is connected to an end of the feeding device.

2. The 3DP filament detection method of claim 1, further comprising:
outputting an abnormal operation signal in response to not reading the nozzle reflected signal in the first predetermined time.

3. The 3DP filament detection method of claim 1, wherein driving a pushrod of the feeding device to move down comprises:
determining whether the feeding device stopping to move up; and
driving a pushrod of the feeding device to move down in response to the feeding device stopping to move up.

4. The 3DP filament detection method of claim 1, wherein driving a pushrod of the feeding device to move down comprises:
driving a pushrod of the feeding device to move down through at least two different drive modes.

5. The 3DP filament detection method of claim 4, wherein driving a pushrod of the feeding device to move down comprises:
driving a pushrod of the feeding device to move down through a first driving mode;
determining whether the first driving mode driving the pushrod to move down; and
driving the pushrod to move down through a second driving mode in response to the first driving mode not driving the pushrod.

6. The 3DP filament detection method of claim 5, wherein the first driving mode comprises a first driving speed and a first driving strength; the second driving mode comprises a second driving speed and a second driving strength; the first driving speed is greater than the second driving speed; and the second driving strength is greater than the first driving strength.

7. The 3DP filament detection method of claim 1, further comprising:
outputting an abnormal operation signal in response to not reading the filament reflected signal in the second predetermined time and controlling the pushrod to stop moving.

8. A 3DP filament detection system comprising:
a detection device;
a driving device;
an indication module; and
a feeding device comprising:
 a feeding cylinder;
 a nozzle connected to a end of the feeding cylinder;
 a piston accommodated in the feeding cylinder; and
 a pushrod configured to push the piston and drive the nozzle to output a filament;
wherein when the driving device drives the feeding device to move down, the detection device is configured to determine whether a nozzle reflected signal is read;
when the detection device reads the nozzle reflected signal, the driving device is further configured to drive the feeding device to move up a predetermined distance;

after the feeding device stops to move up, the driving device is further configured to drive the pushrod to move down, and the detection device is further configured to determine whether a filament reflected signal is read in a first predetermined time; and
when the detection device reads the filament reflected signal in the first predetermined time, the driving device is further configured to control the pushrod to stop moving and the indication module is configured to output a normal operation signal.

9. The 3DP filament detection system of claim 8, wherein when the detection device does not read the nozzle reflected signal in a second predetermined time, the indication module is further configured to output an abnormal operation signal.

10. The 3DP filament detection system of claim 8, wherein the driving device is configured to drive the pushrod to move down through at least two different drive modes.

11. The 3DP filament detection system of claim 10, wherein the driving device is configured to drive the pushrod to move down through a first driving mode; when the driving device is unable to drive the pushrod to move down through the first driving mode, the driving device is further configured to drive the pushrod to move down through a second driving mode.

12. The 3DP filament detection system of claim 11, wherein the first driving mode comprises a first driving speed and a first driving strength; the second driving mode comprises a second driving speed and a second driving strength; the first driving speed is greater than the second driving speed; and the second driving strength is greater than the first driving strength.

13. The 3DP filament detection system of claim 8, wherein when the detection device does not read the filament reflected signal in the first predetermined time, the indication module is further configured to output an abnormal operation signal, and the driving device is further configured to control the pushrod to stop moving.

14. A feeding device comprising:
a feeding cylinder;
a nozzle connected to a end of the feeding cylinder;
a piston accommodated in the feeding cylinder; and
a pushrod configured to push the piston moving to make the nozzle outputting a filament;
wherein when a driving device drives the feeding device to move down, a detection device is configured to determine whether a nozzle reflected signal is read;
when the detection device reads the nozzle reflected signal, the driving device is further configured to drive the feeding device to move up a predetermined distance;
after the feeding device stops moving up, the driving device is further configured to drive the pushrod to move down, and the detection device is further configured to determine whether a filament reflected signal is read in a first predetermined time; and
when the detection device reads the filament reflected signal in the first predetermined time, the driving device is further configured to control the pushrod to stop moving and an indication module is configured to output a normal operation signal.

15. The feeding device of claim 14, wherein when the detection device does not read the nozzle reflected signal in a second predetermined time, the indication module is further configured to output an abnormal operation signal.

16. The feeding device of claim 14, wherein the driving device is configured to drive the pushrod to move down through at least two different drive modes.

17. The feeding device of claim 16, wherein the driving device is configured to drive the pushrod to move down through a first driving mode; when the driving device is unable to drive the pushrod to move down through the first driving mode, the driving device is further configured to drive the pushrod to move down through a second driving mode.

18. The feeding device of claim 17, wherein the first driving mode comprises a first driving speed and a first driving strength; the second driving mode comprises a second driving speed and a second driving strength; the first driving speed is greater than the second driving speed; and the second driving strength is greater than the first driving strength.

19. The feeding device of claim 14, wherein when the detection device does not reads the filament reflected signal in the first predetermined time, the indication module is further configured to output an abnormal operation signal, and the driving device is further configured to control the pushrod to stop moving.

* * * * *